US011292506B2

(12) United States Patent
Bugosh et al.

(10) Patent No.: US 11,292,506 B2
(45) Date of Patent: Apr. 5, 2022

(54) YOKE SUPPORT ASSEMBLY FOR A RACK AND A PINION GEAR OF A STEERING ASSEMBLY FOR A VEHICLE

(71) Applicant: TRW Automotive U.S. LLC, Livonia, MI (US)

(72) Inventors: Mark Bugosh, Sterling Heights, MI (US); Brian A. Urbach, Rochester Hills, MI (US)

(73) Assignee: ZF Active Safety and Electronics US LLC, Livonia, MI (US)

( * ) Notice: Subject to any disclaimer, the term of this patent is extended or adjusted under 35 U.S.C. 154(b) by 411 days.

(21) Appl. No.: 16/427,664

(22) Filed: May 31, 2019

(65) Prior Publication Data
US 2020/0377141 A1 Dec. 3, 2020

(51) Int. Cl.
*B62D 3/12* (2006.01)
*F16H 55/28* (2006.01)
(52) U.S. Cl.
CPC ........... *B62D 3/123* (2013.01); *F16H 55/283* (2013.01); *F16H 2055/281* (2013.01)
(58) Field of Classification Search
CPC .. B62D 3/123; F16H 2055/281; F16H 55/283
See application file for complete search history.

(56) References Cited

U.S. PATENT DOCUMENTS

| 6,749,040 | B1 * | 6/2004 | Menjak | B62D 3/123 180/443 |
|---|---|---|---|---|
| 7,055,646 | B2 | 6/2006 | Bugosh | |
| 7,159,689 | B2 * | 1/2007 | Murakami | B62D 3/123 180/443 |
| 8,307,940 | B2 | 11/2012 | Bugosh et al. | |
| 9,010,208 | B2 | 4/2015 | Urbach | |
| 2004/0211620 | A1 * | 10/2004 | Murakami | B62D 3/123 180/444 |
| 2013/0319141 | A1 * | 12/2013 | Yamamoto | F16H 55/283 74/30 |
| 2014/0026694 | A1 * | 1/2014 | Wodtke | F16H 55/286 74/30 |
| 2014/0366660 | A1 * | 12/2014 | Speidel | F16H 19/04 74/30 |
| 2015/0191197 | A1 * | 7/2015 | Lucchi | F16H 19/04 74/409 |

(Continued)

*Primary Examiner* — William Kelleher
*Assistant Examiner* — Gregory T Prather
(74) *Attorney, Agent, or Firm* — Robert James Harwood

(57) ABSTRACT

A vehicle steering assembly comprises a steering member with a rack portion having rack teeth, a pinion gear having pinion teeth configured to be engaged with the rack teeth, a yoke support assembly supporting the steering member in a housing, and a ball nut operatively connected to the steering member. The pinion gear divides the steering member into a first side having the yoke support assembly outboard of an area of engagement of the rack and pinion teeth and a second side having the ball nut. The yoke support assembly includes complementary convex and concave bearing surfaces configured to provide relative rotation between the convex and concave bearing surfaces. The yoke assembly also includes a spring member configured to produce a variable rate spring force to maintain an engagement between the rack and pinion teeth.

17 Claims, 11 Drawing Sheets

(56) References Cited

U.S. PATENT DOCUMENTS

2016/0229443 A1* 8/2016 Takei .................. B62D 3/123
2017/0037952 A1* 2/2017 Kikuchi ............... F16H 55/283
2020/0290665 A1* 9/2020 Toyoda ................ B62D 5/04

* cited by examiner

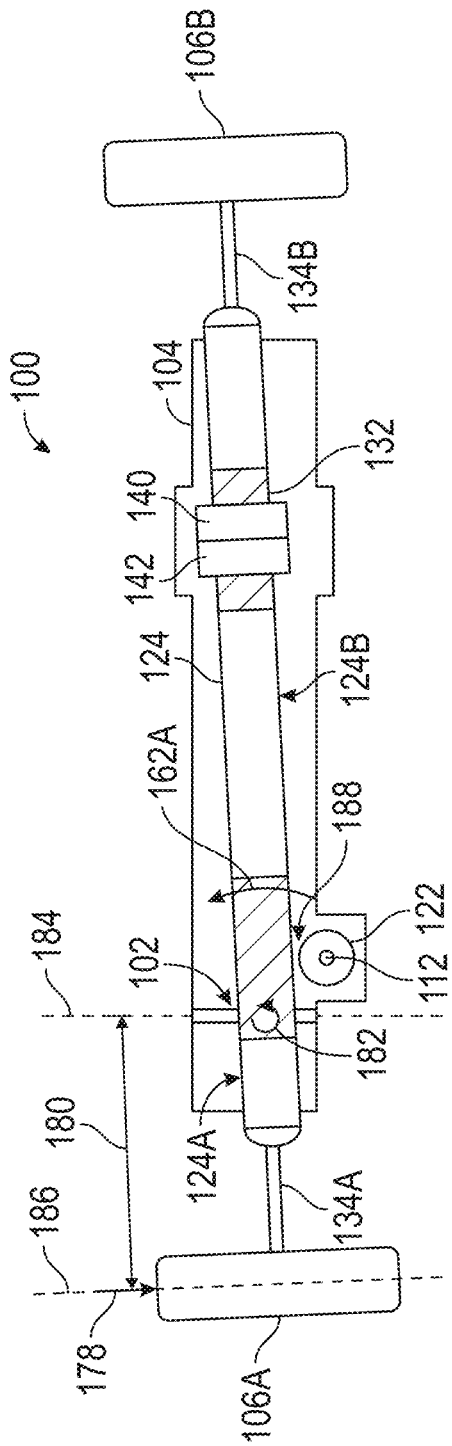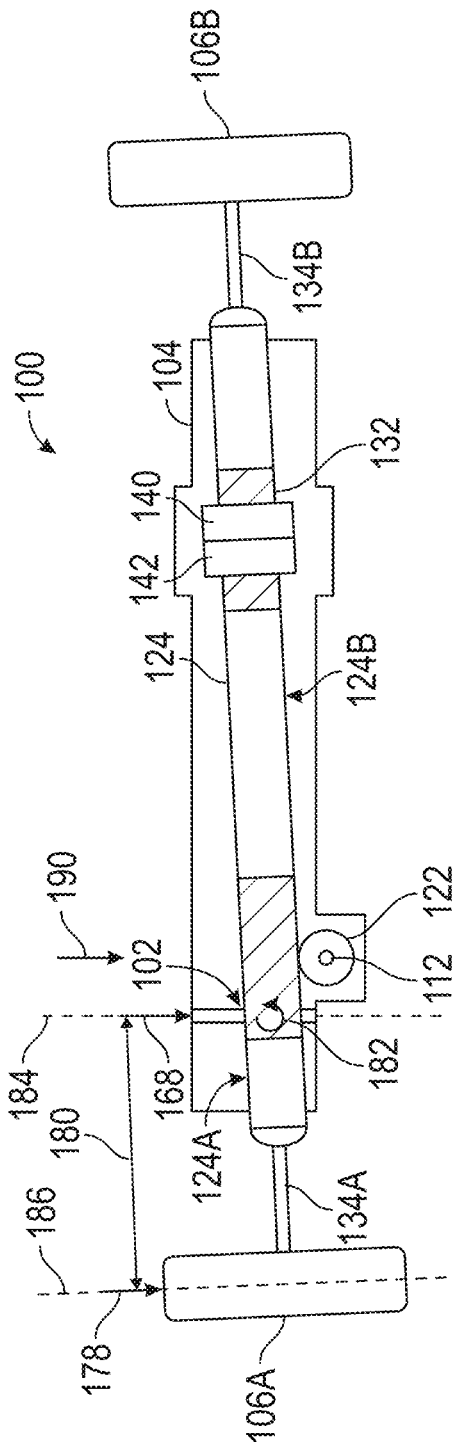
FIG. 10B
FIG. 10C

YOKE SUPPORT ASSEMBLY FOR A RACK AND A PINION GEAR OF A STEERING ASSEMBLY FOR A VEHICLE

BACKGROUND OF INVENTION

This invention relates in general to steering assemblies for vehicles and in particular to an improved yoke support assembly for a rack and a pinion gear of such a vehicle steering assembly.

An automotive vehicle commonly includes a steering assembly to turn steerable wheels of the vehicle. The steering assembly may include a rack and a pinion gear engaged together to convert rotational movement of a steering wheel into linear movement of a steering member of the assembly. Specifically, the pinion gear is rotated by the steering wheel and the rack is a portion of the steering member. The steerable wheels are connected by tie rods to opposite ends of the steering member. The linear movement of the steering member then turns the steerable wheels.

In supporting the steerable wheels, a road surface applies a load to each of the steerable wheels. The load on each of the steerable wheels produces a corresponding moment on the steering member. The moments change as the loads producing the moments change. The direction of the loads change as the steerable wheels travel over the road surface because the road surface is typically uneven. At times, one or more of the loads may be of a magnitude and/or in a direction that results in one of the moments rotating the steering member such that the rack disengages from the pinion gear. Then, when the loads change to a different magnitude and/or acting in another direction, the steering member may rotate back such that the rack reengages with the pinion gear. The rack reengaging the pinion gear results in undesirable noise, vibration, and harshness for the steering assembly.

The steering assembly may be provided with a saddle yoke at the pinion gear to maintain engagement between the rack and the pinion gear. The saddle yoke is provided at the pinion gear such that a centerline of the pinion gear aligns with a centerline of the saddle yoke. Typically, the saddle yoke has a metal spring that produces a spring force transmitted through the saddle yoke to the rack. The spring force acts in a direction towards the pinion gear and presses or otherwise displaces the rack against the pinion gear. In doing so, the spring force of the saddle yoke maintains engagement between the rack and the pinion gear by offsetting or otherwise countering the moment on the steering member that would disengage the rack from the pinion gear.

However, there are loads acting on the steerable wheels that produce moments on the steering member that the metal spring may not offset because the metal spring has a constant spring rate. As a result, the noise, vibration, and harshness resulting from the rack disengaging and then reengaging with the pinion gear is not fully mitigated by the saddle yoke. Furthermore, the saddle yoke is installed in a separate yoke bore in a housing of the steering assembly. The yoke bore for the saddle yoke is an additional point at which water may leak into and infiltrate the steering assembly as well as requiring additional machining and material to provide. Thus, it would be desirable to reduce noise, vibration, and harshness of the steering assembly from the saddle yoke as well as eliminate the separate yoke bore to reduce machining costs and the potential leak path.

SUMMARY OF INVENTION

This invention relates to a yoke support assembly for maintaining engagement between a rack and a pinion gear of a steering assembly for a vehicle.

According to one embodiment, a vehicle steering assembly may comprise, individually and/or in combination, one or more of the following features: a housing, a steering member configured to be operatively disposed in the housing, a rack portion of the steering member has rack teeth, a pinion gear configured to be operatively rotated by a steering wheel, a yoke support assembly, and a ball nut operatively connected to the steering member. The pinion gear is configured to divide the steering member into first and second sides and also has pinion teeth which are configured to be operatively engaged with the rack teeth. The yoke support assembly is configured to be disposed on the first side of the steering member outboard an area of engagement of the rack teeth and the pinion teeth. The yoke support assembly is configured to operatively maintain the engagement between the rack teeth and the pinion teeth to assist in self-alignment of a ball nut. The ball nut is on the second side of the steering member.

According to this embodiment, the yoke support assembly may include a spring member. The spring member is configured to operatively maintain the engagement between the rack teeth and the pinion teeth. A first distance from the spring member to an end of the steering member may be less than a second distance from the pinion gear to the end. The spring member may be formed of a polymer or elastomer material. The spring member may have a variable spring rate.

According to this embodiment, the vehicle steering assembly may further comprise complementary convex and concave bearing surfaces of the yoke support assembly. The convex bearing surface and the concave bearing surface are configured to provide relative rotation between the convex and concave bearing surfaces. The vehicle steering assembly may still further comprise at least two members, wherein one of the members has the convex bearing surface and the other of the members has the concave bearing surface and the convex and concave bearing surfaces are configured to provide relative rotation between the at least two members.

According to another embodiment, a vehicle steering assembly may comprise, individually and/or in combination, one or more of the following features: a housing, a steering member configured to be operatively disposed in the housing, a rack portion of the steering member has rack teeth, a pinion gear configured to be operatively rotated by a steering wheel, and a yoke support assembly configured to support the steering member in the housing. The pinion gear has pinion teeth which are configured to be operatively engaged with the rack teeth. The yoke support assembly includes a spring member. The spring member is configured to produce a variable rate spring force. The variable rate spring force is configured to operatively maintain an engagement between the rack teeth and the pinion teeth.

According to this embodiment, the vehicle steering assembly may further comprise complementary convex and concave bearing surfaces of the yoke support assembly. The convex bearing surface and the concave bearing surface are configured to provide relative rotation between the convex and concave bearing surfaces. The vehicle steering assembly may still further comprise at least two members, wherein one of the members has the convex bearing surface and the other of the members has the concave bearing surface and the convex and concave bearing surfaces are configured to provide relative rotation between the at least two members. Alternatively, the vehicle steering assembly may further comprise inner and outer members of the yoke support assembly. The inner member has the convex bearing surface and the outer member has the concave bearing surface.

Alternatively, an inner member of the yoke support assembly may have the convex bearing surface and the housing may have an inner surface having the concave bearing surface. When the housing has the inner surface with the concave bearing surface, the yoke support assembly may yet further comprise a retention member and a second concave bearing surface on the retention member. The retention member is configured to retain the yoke support assembly in the housing. The second concave bearing surface is also complementary to the convex bearing surface and configured to provide relative rotation between the convex bearing surface and the second concave bearing surface.

According to this embodiment, a second spring member may be configured to produce a second spring force. The second spring force is configured to operatively maintain the engagement between the rack teeth and the pinion teeth.

According to this embodiment, the spring member may be formed of a polymer or elastomer material.

According to this embodiment, the variable spring rate has a logarithmic deflection curve.

According to this embodiment, the vehicle steering assembly may further comprise a retention member that is configured to retain the yoke support assembly in the housing.

According to this embodiment, the vehicle steering assembly may further comprise a ball nut operatively connected to the steering member. The pinion gear is configured to divide the steering member into first and second sides. The yoke support assembly is disposed on the first side of the steering member outboard an area of the engagement between the rack teeth and the pinion teeth. The ball nut is operatively connected to the steering member on the second side of the steering member.

According to yet another embodiment, a vehicle steering assembly may comprise, individually and/or in combination, one or more of the following features: a housing, a steering member configured to be operatively disposed in the housing, a rack portion of the steering member has rack teeth, a pinion gear configured to be operatively rotated by a steering wheel, a yoke support assembly configured to support the steering member in the housing, and a ball nut operatively connected to the steering member. The pinion gear is configured to divide the steering member into first and second sides and also has pinion teeth which are configured to be operatively engaged with the rack teeth. The yoke support assembly is configured to be disposed on the first side of the steering member outboard of an area of engagement of the rack teeth and the pinion teeth. The yoke support assembly includes complementary convex and concave bearing surfaces. The convex bearing surface and the concave bearing surface are configured to provide relative rotation between the convex and concave bearing surfaces. The ball nut is operatively connected to the steering member on the second side of the steering member.

According to this embodiment, the yoke support assembly may have inner and outer members. The inner member has the convex bearing surface and the outer member has the concave bearing surface.

According to this embodiment, the yoke support assembly may include a spring member. The spring member is configured to produce a variable rate spring force. The variable rate spring force is configured to operatively maintain an engagement between the rack teeth and the pinion teeth.

One or more potential and/or realized advantages of an embodiment of the yoke support assembly includes a reduction of noise, vibration, and harshness for the steering assembly, elimination of the yoke bore, and assistance in self-alignment of a ball nut of the steering assembly for a reduction of noise, vibration, and harshness, as well as friction, for the steering assembly.

BRIEF DESCRIPTION OF DRAWINGS

FIGS. 10A-10C are schematic section views taken along line 10-10 of FIG. 1.

DETAILED DESCRIPTION OF THE PREFERRED EMBODIMENTS

Figure 1:
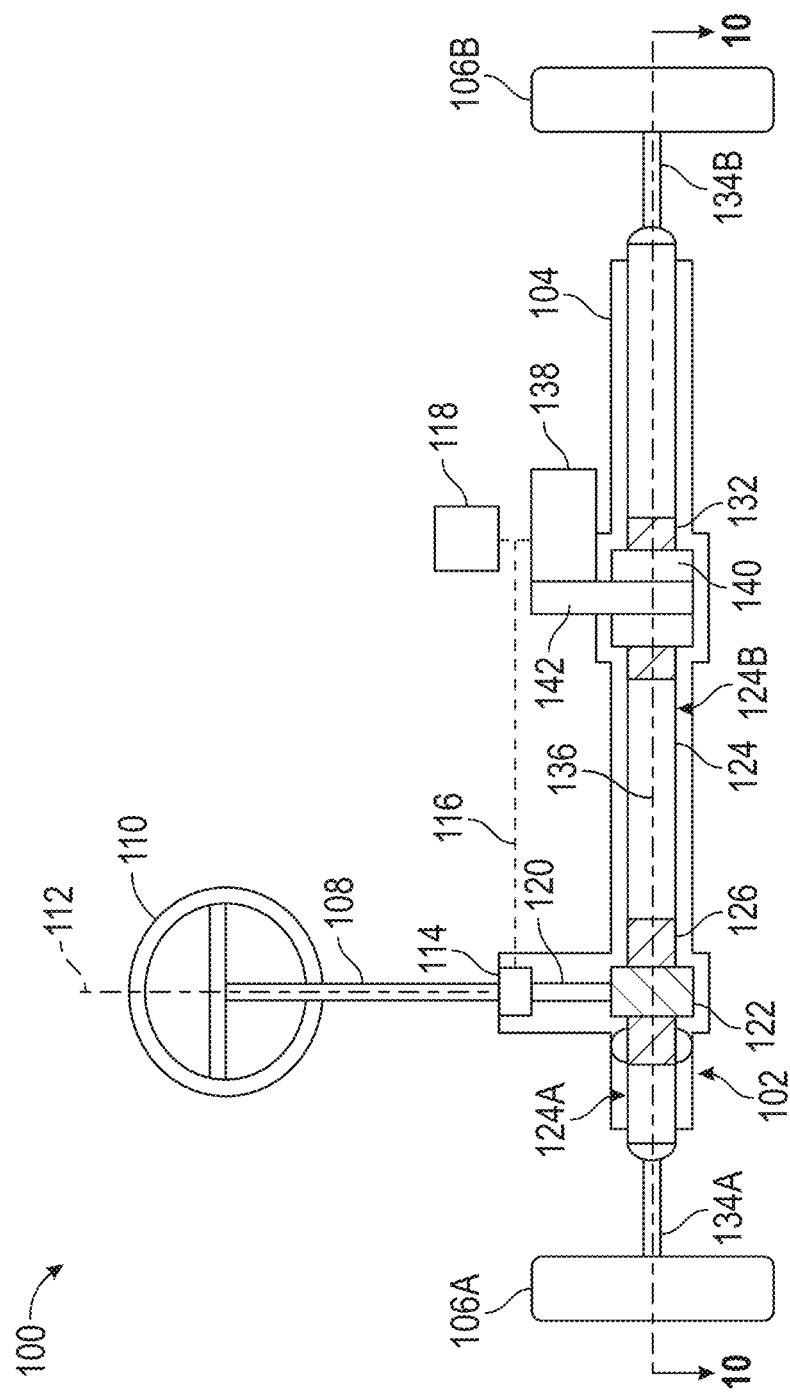
FIG. 1 is a schematic view of a steering assembly having an embodiment of a yoke support assembly in accordance with a first embodiment of the present invention.

Referring now to FIG. 1, there is schematically illustrated a steering assembly, indicated generally at 100, for a vehicle. The steering assembly 100 has a swivel yoke support assembly, indicated generally at 102, produced in accordance with a first embodiment of the present invention. The term "swivel" as used herein is meant to mean rotation of a component about multiple axes. As described herein, the steering assembly 100 is a power assisted steering assembly although such is not necessary. The swivel yoke support assembly 102 may be used with a particular steering assembly regardless of whether the particular steering assembly is power assisted or not.

The general structure and operation of the steering assembly 100 is conventional in the art. For example, the steering assembly 100 may be as disclosed by U.S. Pat. No. 8,307,940 to Bugosh et al. or U.S. Pat. No. 7,055,646 to Bugosh, the disclosures of both of which are hereby incorporated by reference in entirety herein. Thus, only those portions of the steering assembly 100 which are necessary for a full understanding of this invention will be explained and illustrated in detail. Although this invention will be described and illustrated in connection with the particular steering assembly 100 disclosed herein, it will be appreciated that this invention may be used in connection with other types of steering assemblies, including those having electric, hydraulic, or other power assistance as known to those skilled in the art.

As will be discussed, components of the steering assembly 100, including the yoke support assembly 102, are housed within a housing 104. As a non-limiting example, the housing 104 may comprise two or more individual housings joined together by a known means as the housing 104.

Alternatively, the housing 104 may be a single, unitary housing not comprised of individual housings.

The steering assembly 100 is associated with first and second steerable wheels 106A and 106B, respectively, of the vehicle and includes a rotatable input shaft 108. A vehicle steering wheel or other input 110 is operatively coupled to the input shaft 108 for rotation therewith about a steering axis 112. A torque sensor 114 is located within the housing 104. The torque sensor 114 generates signals in response to rotation of the input shaft 108. The signals are transmitted over a data network 116 to an electronic control unit (ECU) 118. The signals indicate a direction and magnitude of steering torque applied to the steering wheel 110.

A torsion bar 120 connects the input shaft 108 to a pinion gear 122, which is located inside the housing 104. The torsion bar 120 twists in response to the steering torque applied to the steering wheel 110. When the torsion bar 120 twists, relative rotation occurs between the input shaft 108 and the pinion gear 122.

A linearly moveable steering member 124 is at least partially in, and extends axially through, the housing 104. The steering member 124 is supported in the housing 104, at least partially, by the yoke support assembly 102, The steering member 124 extends linearly (or axially) between the first and second steerable wheels 106A and 106B, respectively.

The pinion gear 122 divides the steering member 124 into first and second sides, indicated generally at 124A and 124B, respectively. The first side 124A of the steering member 124 is between the pinion gear 122 and the first steerable wheel 106A. The second side 124B of the steering member 124 is between the pinion gear 122 and the second steerable wheel 106B. As illustrated, the yoke support assembly 102 is disposed on the first side 124A of the steering member 124.

A rack portion 126 of the steering member 124 is provided with a series of rack teeth 128 (shown in FIG. 4) which meshingly engage with pinion teeth 130 (also shown in FIG. 4) provided on the pinion gear 122 to operatively connect the pinion gear 122 and the rack portion 126. The steering member 124 further includes a screw portion 132 having an external screw thread convolution.

The steering member 124 is connected to the first steerable wheel 106A by a first tie rod 134A and the second steerable wheel 106B by a second tie rod 134B. The first and second tie rods 134A and 134B, respectively, are located at distal ends of the steering member 124. The steering member 124 and the first and second tie rods 134A and 134B, respectively, are moveable relative to the housing 104. The linear movement of the steering member 124 along a housing axis 136 results in steering movement of the first and second steerable wheels 106A and 106B, respectively, in a known manner.

The steering assembly 100 further includes a power source 138 drivably connected to a ball nut 140. As illustrated, the ball nut 140 is operatively connected to the steering member 124 on the second side 124B of the steering member 124. The power source 138 is illustrated as an electric motor, but may be other than an electric motor. As a non-limiting example, the power source 138 may be a hydraulic system. The ECU 118 controls the power source 138 in accordance with the signals received from the torque sensor 114. Control signals for the power source 138 are transmitted from the ECU 118 to the power source 138 via the data network 116.

The illustrated power source 138 and the ball nut 140 are operatively connected by a pulley assembly 142. The pulley assembly 142 includes a belt transmitting rotational power between an output of the power source 138 and the ball nut 140. Alternatively, the power source 138 may be operatively connected to the ball nut 140 by a force transmission means other than the pulley assembly 142.

The ball nut 140 is operatively connected with the screw portion 132 of the steering member 124 in a known manner. The ball nut 140 effects the linear movement of the steering member 124 upon rotation of the steering wheel 110. As discussed, the power source 138 is operated in response to rotation of the steering wheel 110 and the ball nut 140 is driven by the power source 138 via the pulley 140. When the ball nut 140 is driven, the ball nut 140 rotates and, because the ball nut 140 is linearly fixed in position on the housing axis 136, the steering member 124 moves linearly. The linear movement of the steering member 124 effects steering movement of the first and second steerable wheels 106A and 106B, respectively, of the vehicle. The power source 138 thus provides steering assistance in response to the applied steering torque.

In the event of the inability of the power source 138 to effect the linear movement of the steering member 124, a mechanical connection between the rack teeth 128 and the pinion teeth 130 permits manual steering of the vehicle. The pinion gear 122 and the rack portion 126 cooperate to convert rotation of the steering wheel 110 around the steering axis 112 into linear movement of the steering member 124 along the housing axis 136.

Figure 2:
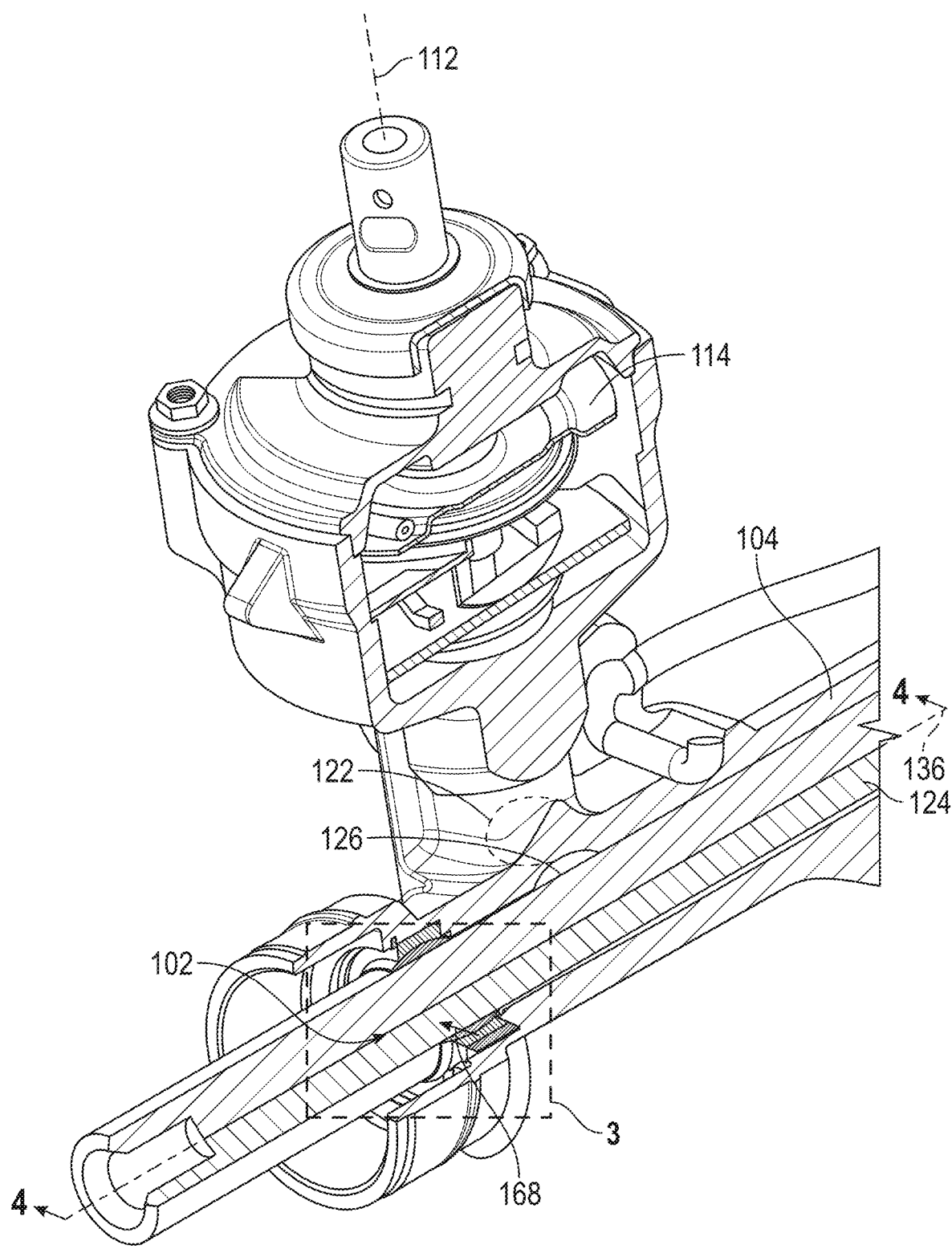
FIG. 2 is a cut away perspective view of the yoke support assembly of FIG. 1.
Figure 3:
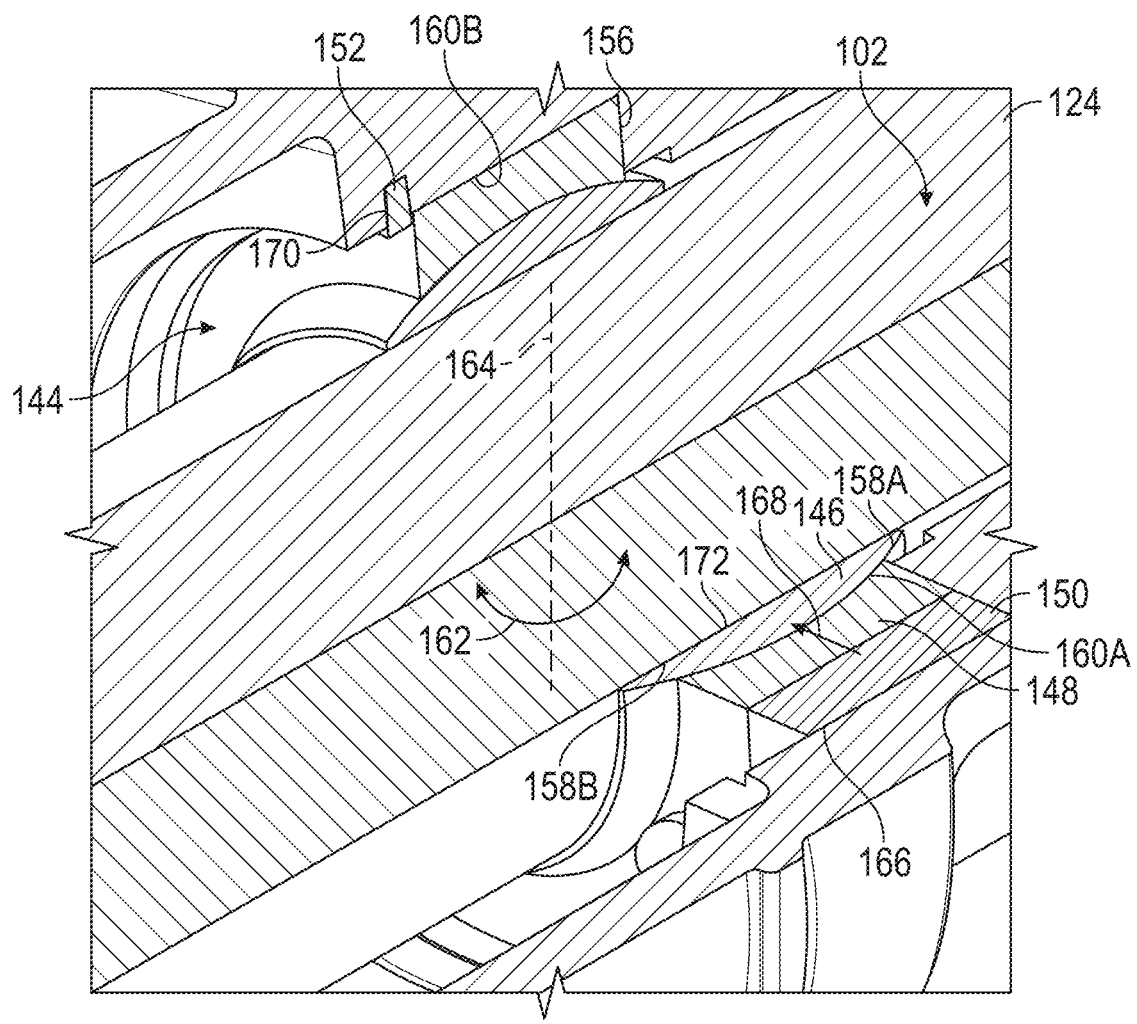
FIG. 3 is an enlarged portion of FIG. 2.
Figure 4:
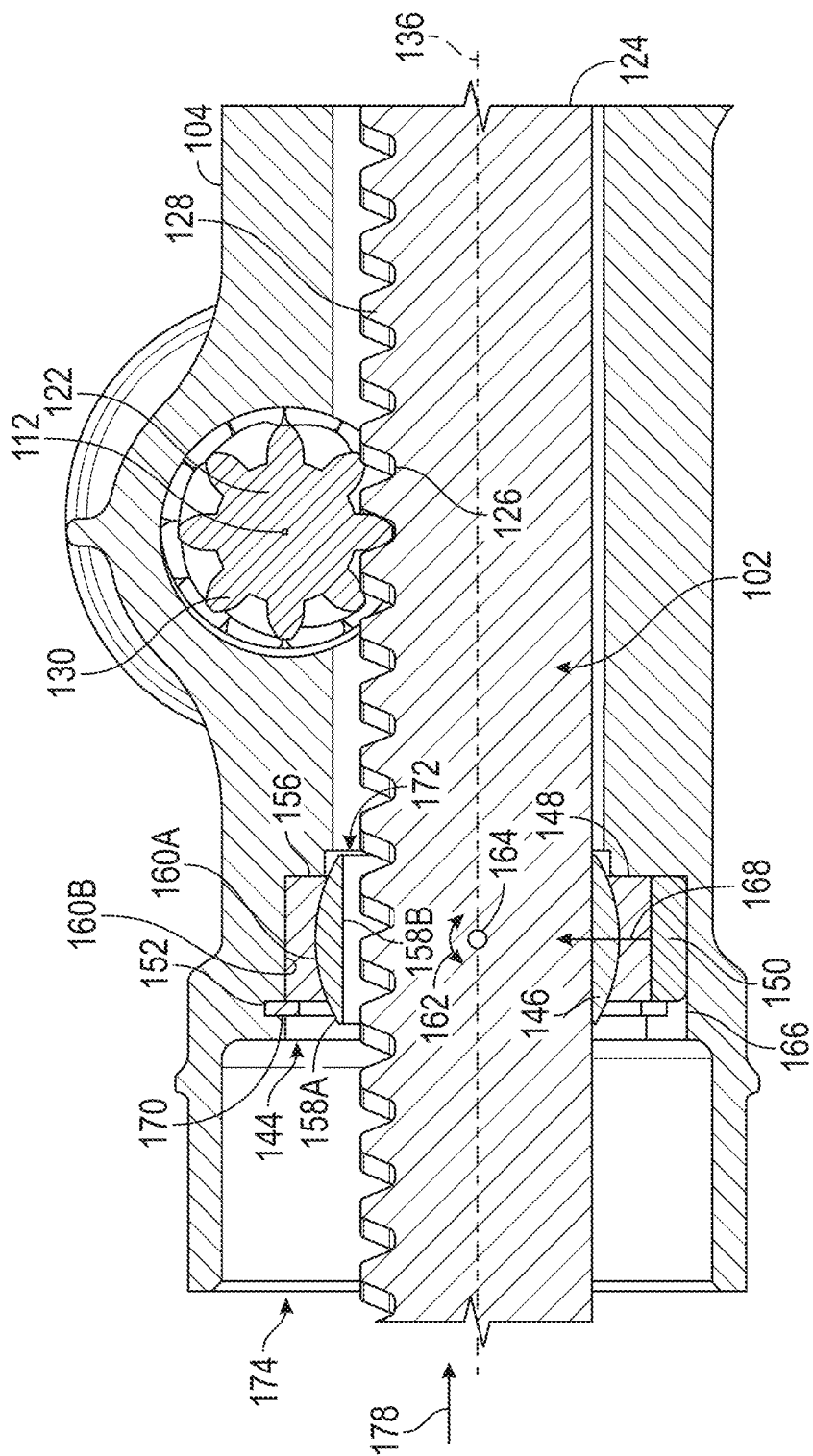
FIG. 4 is a section view taken along line 4-4 of FIG. 2.

Referring now to FIGS. 2-4, the yoke support assembly 102 is illustrated in detail. Although not required, the yoke support assembly 102 may include a swivel yoke, indicated generally at 144, that has a first or inner member 146 and a second or outer member 148, as will be discussed below in detail. The yoke support assembly 102 further includes a spring member 150 and a retention member 152. The rack portion 126 passes through a center opening 154 (best shown in FIGS. 5A and 5B) in the yoke support assembly 102. As illustrated, the yoke support assembly 102 is installed in a recess 156 in the housing 104.

The inner member 146 has an outer surface 158A and an inner surface 158B. The center opening 154 is defined by the inner surface 158B of the inner member 146. As illustrated, the outer surface 158A has a convex shape along the housing axis 136 and the inner surface 158B has a linear shape that is parallel to the housing axis 136—i.e., as shown in FIGS. 3 and 4, the outer surface 158A has a convex shape and the inner surface 158B has a linear shape. Alternatively, the inner surface 158B may have other than a linear shape along the housing axis 136. The inner surface 158B is preferably complementary to the steering member 124 such that the inner surface 158B supports the steering member 124. Alternatively, the inner surface 158B may be any shape suitable to support the steering member 124.

The inner member 146 has an annular shape that extends around the steering member 124 and the housing axis 136. The inner member 146 is defined by revolving the outer and inner surfaces 158A and 158B, respectively, around the housing axis 136 while the outer and inner surfaces 158A and 158B, respectively, are coplanar with the housing axis 136. Preferably, the inner member 146 extends around the steering member 124 at the rack portion 126. Alternatively, as a non-limiting example, the inner member 146 may be outboard of the rack portion 126.

Preferably, the inner member 146 is produced from a polymer material. As a non-limiting example, the polymer material may be rubber. Producing the inner member 146 from a polymer material reduces friction with the outer member 148 as well as reduces overall noise, vibration, and harshness of the swivel yoke 144. Alternatively, the inner member 146 may be produced from metal or polyethylene. Alternatively, the inner member 146 may be produced from a combination of materials such as rubber or polyethylene coated metal. As illustrated, the inner member 146 is a solid member although such is not necessary.

The outer member 148 has an inner bearing surface 160A and an outer bearing surface 160B. The inner surface 160A has a shape that is complementary to the convex outer surface 158A of the inner member 146. As illustrated, the inner surface 160A has a concave shape extending along the housing axis 136 and the outer surface 160B has a linear shape parallel to the housing axis 136—i.e., as shown in FIGS. 3 and 4, the inner surface 160A has a concave shape and the outer surface 160B has a linear shape. Alternatively, the outer surface 160B may have other than a linear shape along the housing axis 136. The outer surface 160B is complementary to the housing 104 such that the outer surface 160B supports the swivel yoke 144 on the housing 104.

The outer member 148 has an annular shape that extends around the steering member 124 and the housing axis 136. The outer member 148 is defined by revolving the inner and outer surfaces 160A and 160B, respectively, around the housing axis 136 while the inner and outer surfaces 160A and 160B, respectively, are coplanar with the housing axis 136. Preferably, the outer member 148 extends around the steering member 124 at the rack portion 126. Alternatively, as a non-limiting example, the outer member 148 may be outboard of the rack portion 126.

Preferably, the outer member 148 is produced from a polymer material. As a non-limiting example, the polymer material may be rubber. Producing the outer member 148 from a polymer material reduces friction with the inner member 146 as well as reduces overall noise, vibration, and harshness of the swivel yoke 144. Alternatively, the outer member 148 may be produced from metal or polyethylene. Alternatively, the outer member 148 may be produced from a combination of materials such as rubber or polyethylene coated metal. As illustrated, the outer member 148 is a solid member although such is not necessary. The inner and outer members 148, respectively, may be produced from same or different types of materials.

The inner and outer members 146 and 148, respectively, are assembled to form the swivel yoke 144. Preferably, the inner and outer members 146 and 148, respectively, are separately produced. As a non-limiting example, each of the inner and outer members 146 and 148, respectively, may be separately molded from a polymer material such as rubber. The separate inner and outer members 146 and 148, respectively, may then be set at ninety degrees to each other and slid together. Alternatively, the yoke support assembly may be assembled other than as described herein.

When assembled, the convex outer surface 158A of the inner member 146 and the concave inner surface 160A of the outer member 148 are in contact such that the convex outer surface 158A of the inner member 146 rests, bears, or is otherwise supported on the concave inner surface 160A of the outer member 148. This is because of the complementary shapes between the convex outer surface 158A and the concave inner surface 160A. As a result, the convex outer surface 158A is free to oscillate, rotate, translate, slide, or otherwise move—i.e., swivel—on the complementary concave inner surface 160A to provide relative rotation between the inner and outer members 146 and 148, respectively. The rotation of the convex outer surface 158A on the concave inner surface 160A may be about multiple axes.

When the swivel yoke 144 is omitted from the yoke support assembly 102, a non-swivel yoke is preferably provided in place of the swivel yoke 144. The term "non-swivel yoke" as used herein is meant to mean a structure that supports the steering member 124 while not allowing the steering member 124 to rotate about multiple axes or rotate about the rotation axis 164. As a non-limiting example, the non-swivel yoke supports the steering member 124 in the housing 104 and is provided between the steering member 124 and the spring member 150. As a further non-limiting example, the non-swivel yoke may be a bushing.

As illustrated, the recess 156 is an annular step in the housing 104 but may otherwise be shaped. As a non-limiting example, the recess 156 may be a machined counter bore. Alternatively, the yoke support assembly 102 may be installed in the housing 104 in other than the recess 156 and/or the recess 156 may be other than a machined counter bore.

As the convex outer surface 158A oscillates or otherwise rotates on the concave inner surface 160A, the steering member 124 rotates in a rotation direction 162 (shown in FIGS. 3 and 4) about a rotation axis 164. The rotation axis 164 is in a plane that is perpendicular to the housing axis 136. The rotation axis 164 is not limited to a single or specific perpendicular orientation to the housing axis 136 in the plane because the yoke support assembly 102 is a swivel type bearing for the steering member 124. As such, loads resulting in rotation of the steering member 124 about the rotation axis 164 may be applied in more than one direction. As the direction of the load that rotates the steering member 124 changes, so too does the specific orientation of the rotation axis 164 to the housing axis 136 also change. However, regardless of the direction of the load that rotates the steering member 124, the rotation axis 164 remains perpendicular to the housing axis 136.

The spring member 150 is between the outer member 148 and the housing 104. As illustrated, the spring member 150 is positioned in a slot 166 formed in the housing 104 and shaped to fit the spring member 150. As a non-limiting example, the slot 166 may be machined into the housing 10. Alternatively, the spring member 150 may be provided other than as positioned in the slot 166. Preferably, the spring member 150 has a variable spring rate. More specifically, the spring member 150 preferably has a log normal spring rate such that a deflection curve for the spring member 150 follows a logarithmic deflection curve. Alternatively, the spring member 150 may have other than the variable spring rate. As a non-limiting example, the spring member 150 may have a linear spring rate such that the deflection curve for the spring member 150 follows a linear line.

Furthermore, the spring member 150 is preferably formed from a polymer or an elastomer material such as rubber. Alternatively, the spring member 150 may be other than an elastomer material. As illustrated, the spring member 150 has a generally rectilinear shape. Alternatively, the spring member 150 may have other than the illustrated rectilinear shape. As non-limiting examples, the spring member 150 may have an oval or circular shape. As a further non-limiting example, a surface of the spring member 150 contacting the outer member 148 may have a shape complementary to a curve of the outer member 148.

Preferably, the spring member 150 is retained in the slot 166 by a resistance or interference fit. Alternatively, the spring member 150 may be retained in the slot 166 by other than a resistance or interference fit. As a non-limiting example, the spring member 150 may be retained in the slot 166 by the retention member 152. Alternatively, the spring member 150 may be retained in the slot 166 by the resistance or interference fit in combination with a second retention means or structure.

When the swivel yoke 144 is installed in the housing 104, the spring member 150 is preferably compressed in the slot 166. As a result, the spring member 150 produces a spring force 168 in a direction radially inward towards the housing axis 136. Preferably, the spring force 168 is a variable rate spring force. The spring force 168 maintains a load on the rack portion 126 such that the rack and pinion teeth 128 and 130, respectively, are positively engaged. As a load acting on the rack portion 126 to disengage the rack and pinion teeth 128 and 130, respectively, increases, the spring force increases log normally. This is because, as discussed, the spring member 150 has a log normal spring rate.

Preferably, a direction of the spring force 168 is as illustrated. Specifically, the spring force 168 is perpendicular to the housing axis 136. Preferably, the spring member 150 is positioned on a side of the housing axis 136 opposite an area or point of engagement between the rack and pinion teeth 128 and 130, respectively. Preferably, the area of engagement between the rack and pinion teeth 128 and 130, respectively, is where at least one tooth of the rack teeth 128 is in contact with at least one tooth of the pinion teeth 130. As a result, the spring force 168 maintains engagement between the rack and pinion teeth 128 and 130, respectively. Alternatively, the spring member 150 may be shaped or otherwise tuned to direct the spring force 168 in other than the direction illustrated.

The retention member 152 is disposed in a groove 170 formed in the housing 104 to retain the swivel yoke 144 in position in the housing 104. Preferably, the retention member 152 is a spring loaded snap ring. Alternatively, the retention member 152 may be other than a spring loaded snap ring. Furthermore, when the retention member 152 is other than the spring loaded snap ring, the groove 170 may be omitted. As a non-limiting example, the retention member 152 may be a threaded locking ring that is screwed against the swivel yoke 144. Additionally, as discussed, the retention member 152 may also retain the spring member 150 in the slot 166, singularly or in conjunction with any resistance or interference fit.

As shown in FIG. 4, there is a teeth gap, indicated generally at 172, between the inner surface 158B and the rack teeth 128 (the rack teeth 128 are omitted from FIGS. 2 and 3 for clarity). Preferably, the inner member 146 supports the steering member 124 on all sides of the steering member 124 other than at the teeth gap 172. The teeth gap 172 separates the inner member 146 and the rack teeth 128 to greatly reduce contact between the rack teeth 128 and the inner member 146. This reduces the possibility of the rack teeth 128 damaging the inner member 146. Preferably, the teeth gap 172 is sized to accommodate expected bending of the steering member 124 such that the rack teeth 128 will not be expected to contact the inner member 146. Alternatively, the teeth gap 172 may be omitted. As a non-limiting example, the teeth gap 172 may be omitted when the rack teeth 128 are provided with a shape that would not damage the inner member 146.

Figure 5A:
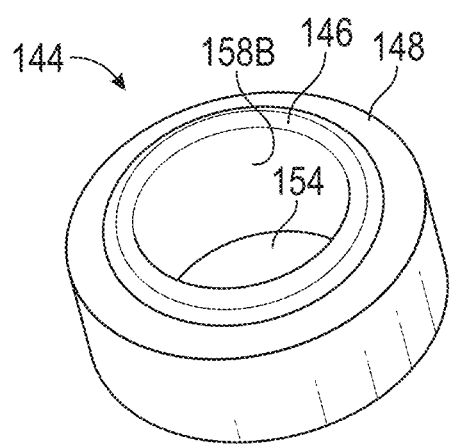
FIGS. 5A and 5B are perspective views of a swivel yoke of the yoke support assembly of FIG. 1.
Figure 5B:
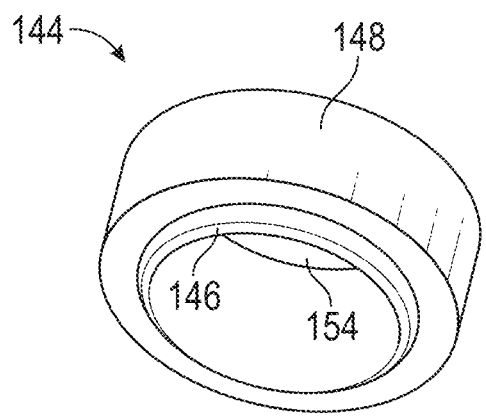
Figure 6A:
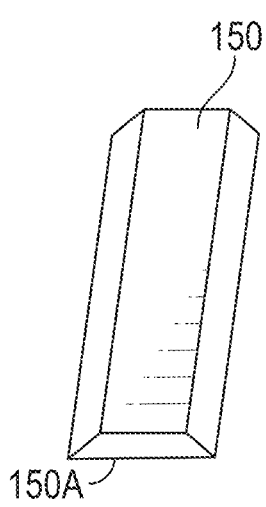
FIGS. 6A and 6B are perspective views of a spring member of the yoke support assembly of FIG. 1.
Figure 6B:
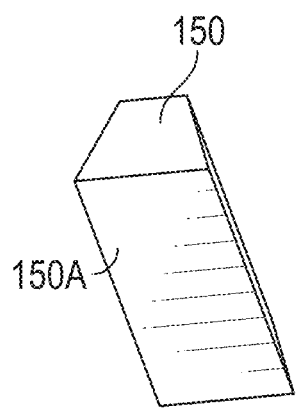

Referring now to FIGS. 5A-6B, the swivel yoke 144 and the spring member 150 are shown in detail. The swivel yoke 144 is shown in FIGS. 5A and 5B and the spring member 150 is shown in FIGS. 6A and 6B. As best shown in FIG. 6B, the spring member 150 has a trapezoidal shape. Preferably, a contact surface 150A of the spring member 150 contacts the swivel yoke 144. Alternatively, a surface of the spring member 150 other than the contact surface 150A contacts the swivel yoke 144. However, as discussed, the spring member 150 may have other than the trapezoidal shape illustrated. As discussed, the spring member 150 may have an oval, circular, or wedge shape.

Figure 7:
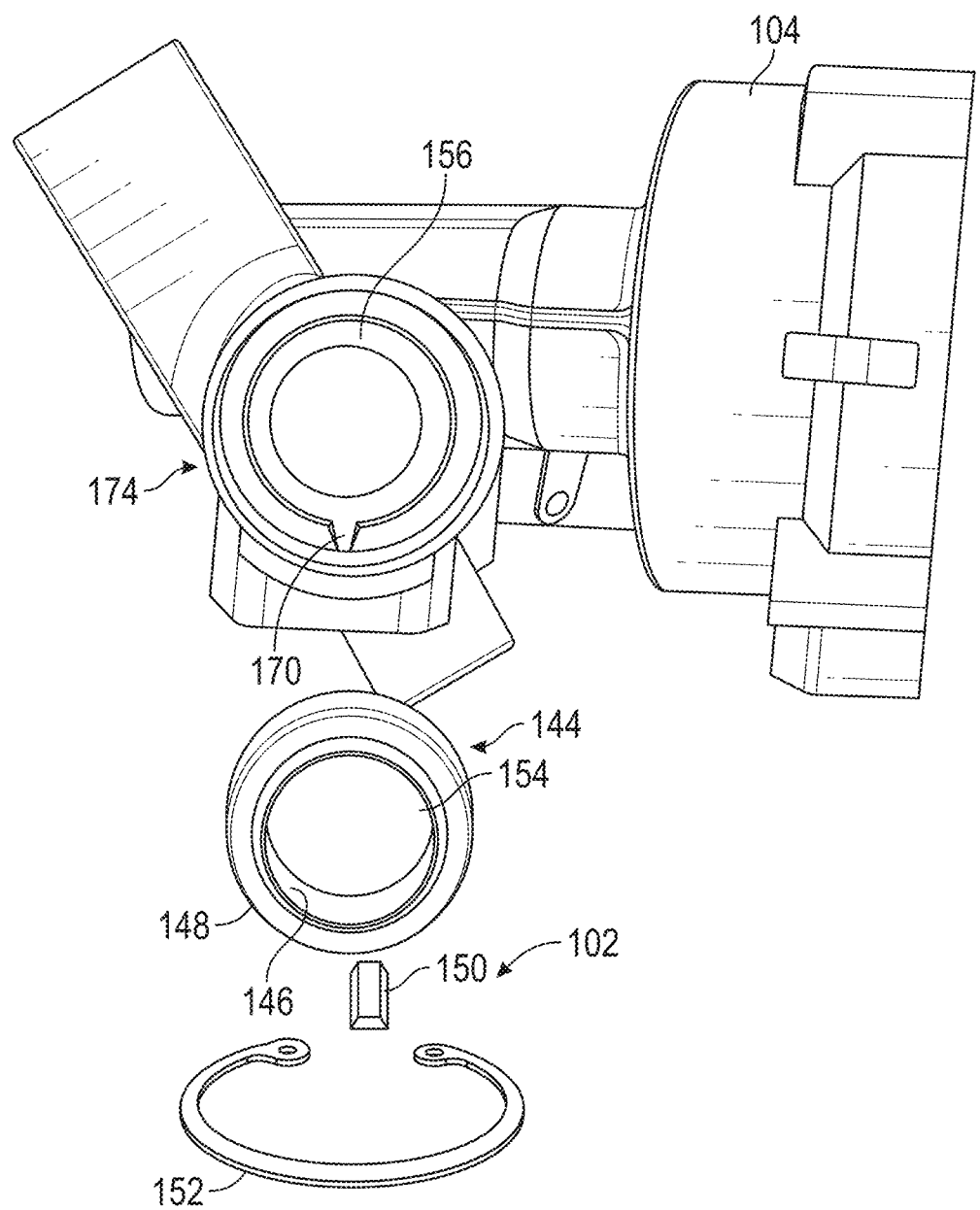
FIG. 7 is a perspective view of the yoke support assembly of FIG. 1 in an unassembled state.
Figure 8:
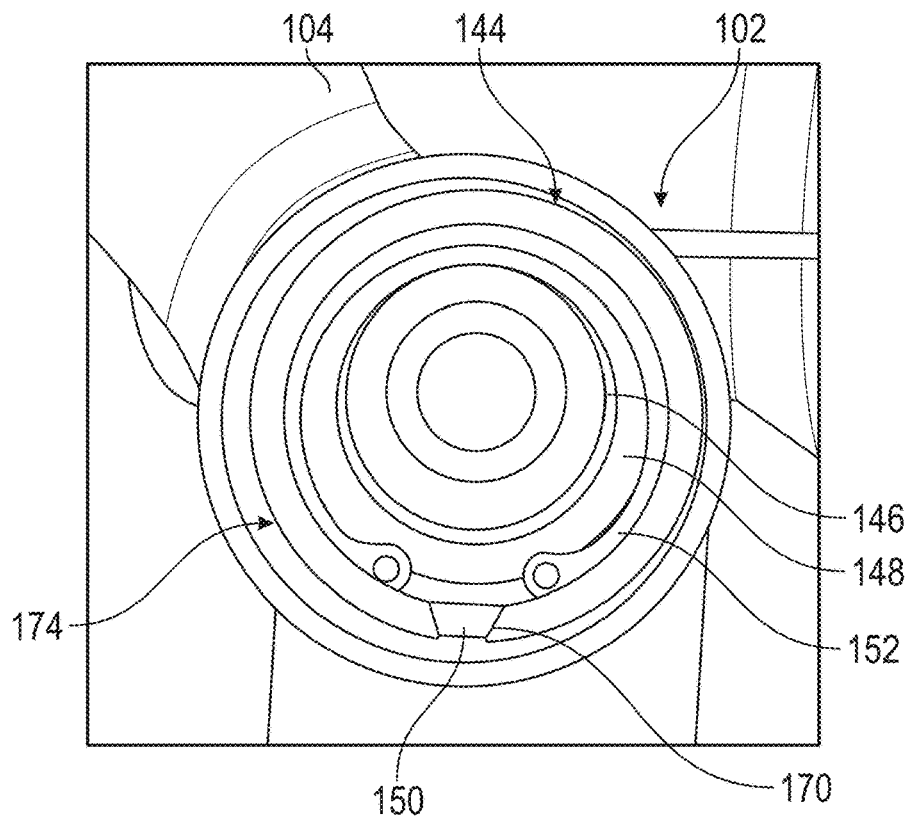
FIG. 8 is a first elevation view of the yoke support assembly of FIG. 1 in an assembled state.
Figure 9:
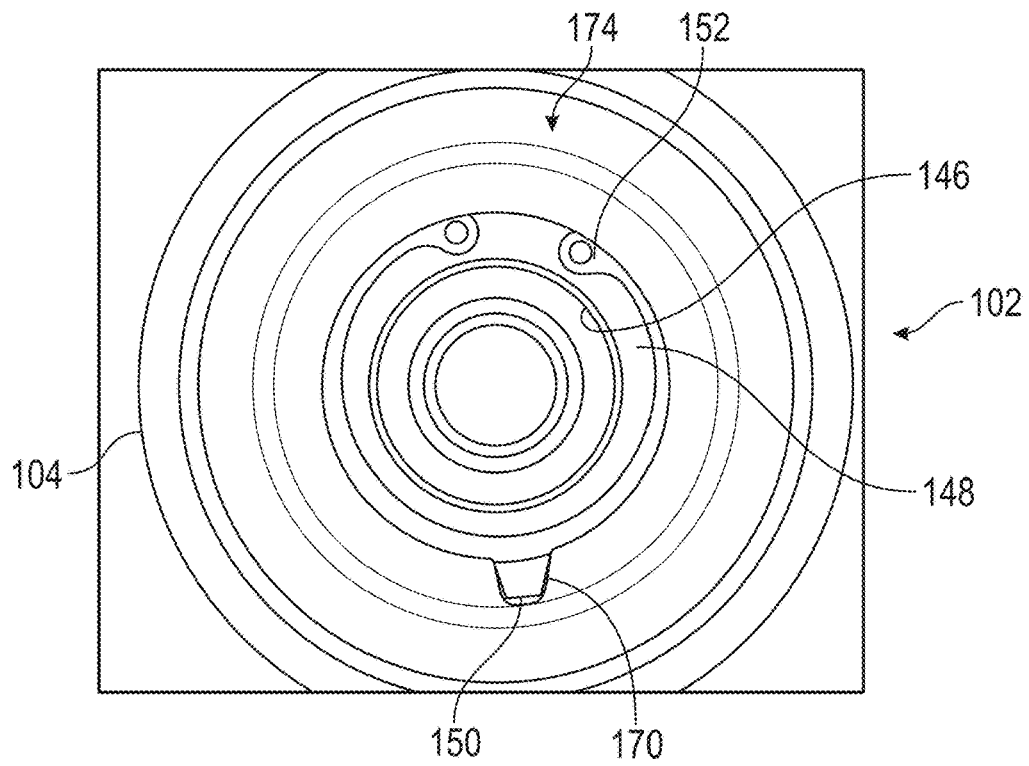
FIG. 9 is a second elevation view of the yoke support assembly of FIG. 1 in the assembled state.

Referring now to FIGS. 7-9, there is illustrated the yoke support assembly 102 in unassembled and assembled states. Specifically, the yoke support assembly is shown in the unassembled state in FIG. 7 and in the assembled state in FIGS. 8 and 9.

The housing 104 has an end opening, indicated generally at 174 (also shown in FIG. 4), through which the steering member 124 extends. The yoke support assembly 102 is preferably installed in the housing 104 through the end opening 174. The yoke support assembly 102 is installed in the housing in an axial direction 176 (shown in FIG. 4) that is parallel to the housing axis 136. Furthermore, the recess 156 and slot 166 are preferably machined in the housing 104 through the end opening 174.

Figure 10A:
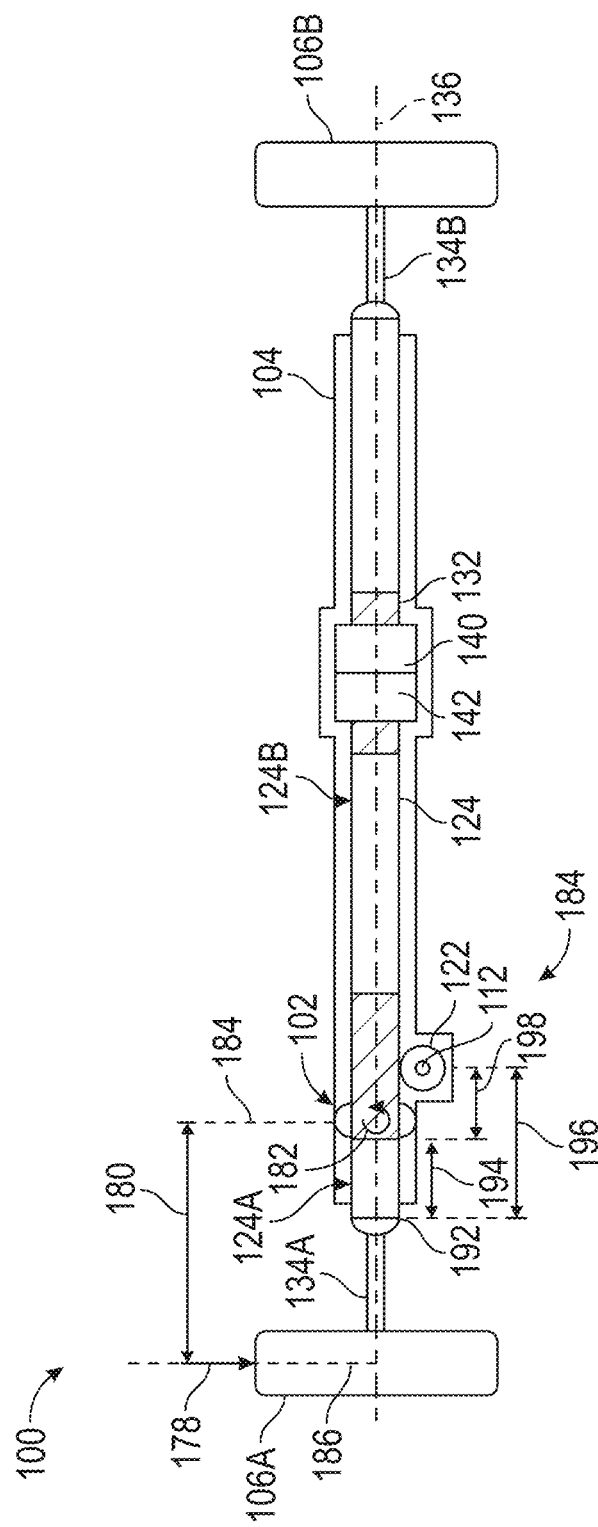

Referring now to FIGS. 10A-10C, there is illustrated movement of the steering member 124. The steering member 124 is shown in a rest position in FIG. 10A, the steering member 124 is rotated in FIG. 10B because of an external load 178, and the rotated steering member 124 is translated by the spring force 168 in FIG. 10C to reengage the rack and pinion teeth 128 and 130, respectively. The steering member 124 rotates in a plane with the external load 178. In FIGS. 10A-10C, the plane in which the external load 178 acts and the steering member 124 rotates is perpendicular to the steering axis 112. Each of FIGS. 10A-10C will now be discussed in detail.

As shown in FIG. 10A, there is a moment arm 180 between a centerline 184 of the yoke support assembly 102 to the external load 178. As illustrated, the external load 178 is applied to a centerline 186 of the first steerable wheel 106A. Thus, as illustrated, the moment arm 180 is defined as between the centerline 184 of the yoke support assembly 102 and the centerline 186 of the first steerable wheel 106A where the external load 178 is applied. Alternatively, the external load 178 may be applied to the first steerable wheel 106A other than at the centerline 186 of the first steerable wheel 106A or the external load 178 may be applied elsewhere on the steering assembly 100 outboard of the yoke support assembly 102—i.e., leftward of the yoke support assembly 102 as shown in FIG. 10A. As a non-limiting example, the external load 178 may be applied to the first tie rod 134A instead of to the first steerable wheel 106A. The external load 178 results in the moment 182 at the yoke support assembly 102. The external load 178 is typically applied to the first steerable wheel 106A by an uneven road surface over which the first steerable wheel 106A is travelling.

As shown in FIG. 10B, the moment 182 acts to separate or otherwise disengage the rack and pinion teeth 128 and 130, respectively, by rotating or deflecting the steering member 124 in a first direction 162A away from the pinion gear 122. This opens a gap, indicated generally at 188, between the rack and pinion teeth 128 and 130, respectively. As the moment arm 180 is reduced, such as disclosed herein by positioning the yoke support assembly 102 further outboard—i.e., leftward in FIG. 10B—from where the rack and pinion teeth 128 and 130, respectively, meshingly engage and nearer to the location of the external load 178, the moment 182 at the yoke support assembly 102 is also reduced. This is in comparison to positioning the yoke support assembly 102 nearer—i.e., rightward in FIG. 10B—to where the rack and pinion teeth 128 and 130, respectively, meshingly engage and further away from the external load 178. As the moment 182 is reduced, the moment 182 which tends to cause separation of the rack and pinion teeth 128 and 130, respectively, is also reduced. Preferably, the yoke support assembly 102 is disposed on the first side 124A of the steering member 124 outboard the area of engagement between the rack and pinion teeth 128 and 130, respectively.

As shown in FIG. 10C, the spring force 168 offsets, or otherwise acts counter to, the moment 182 by translating the rotated or deflected steering member 124 towards the pinion gear 122 in a second direction 190, This restores the engagement between the rack and pinion teeth 128 and 130, respectively. The steering member 124 translating in the second direction 190 offsets rotation of the steering member 124 in the first direction 162A. This closes the gap 188 between the rack and pinion teeth 128 and 130, respectively. Reducing the moment 182 increases an ability of the spring force 168 to offset the moment 182 and maintain the engagement between the rack and pinion teeth 128 and 130, respectively.

As discussed, for FIGS. 10A-10C, the external load 178 acts, and the steering member 124 rotates in, a plane perpendicular to the steering axis 112. The external load 178 being perpendicular to the steering axis 112 is expected to produce the greatest gap 188. Alternatively, the external load 178 may be other than perpendicular to the steering axis 112. As a non-limiting example, when the external load 178 is parallel to the steering axis 112 or acting opposite to what is shown in FIGS. 10A-10C, no disengagement between the rack and pinion teeth 128 and 130, respectively, is expected to result from the external load 178, even without the spring force 168. As a direction of the external load 178 rotates from what is shown in FIGS. 10A-10C to acting parallel to the steering axis 112 (and perpendicular to how the external load 178 is illustrated in FIGS. 10A-10C), the gap 188 is expected to decrease to being closed, even without the spring force 168.

As illustrated and discussed, the movements of the steering member 124 shown in FIGS. 10B and 10C occur in two steps: the steering member 124 rotates as shown in FIG. 10B and then translates as shown in FIG. 10C. Alternatively, in a preferable embodiment, the movements of the steering member 124 shown in FIGS. 10B and 10C occur simultaneously or otherwise concurrently. That is, the spring force 168 translates the steering member 124 in the direction 190 at the same time the external load 178 is rotating the steering member 124 in the direction 162A. Thus, engagement between the rack and pinion teeth 128 and 130, respectively, is maintained or the gap 188 is closed. Preferably, the spring force 168 is sufficient such that the gap 188 does not open when the steering member 124 rotates.

Referring back to FIG. 10A, more generally, an end 192 of the steering member 124 is a first distance 194 from the yoke support assembly 102 and a second distance 196 from the pinion gear 122. The first distance 194 is less than the second distance 196. Thus, the yoke support assembly 102 is positioned closer to the end 192 of the steering member 124 than the pinion gear 122. There is an offset distance 198 between the yoke support assembly 102 and the pinion gear 122. As the offset distance 198 increases, the moment 182 decreases when the external load 178 is constant in magnitude. The yoke support assembly 102 is positioned outboard of the pinion gear 122.

A second load (not shown) may act on the second steerable wheel 106B and result in a second moment at the ball nut 140. The second moment is independent of the moment 182. This is because the ball nut 140 acts as a bearing for the steering member 124.

Furthermore, the convex outer surface 158A oscillating or rotating on the concave inner surface 160A allows the steering member 124 to also oscillate or otherwise rotate. The oscillation of the steering member 124 allows or otherwise accounts for possible misalignment of the components of the steering assembly 100 during assembly of the steering assembly 100. The misalignment may result from allowable tolerances in production and assembly of the steering assembly 100. As a non-limiting example, the misalignment may be between the pinion gear 122 and the ball nut 140.

The oscillation or other rotation of the steering member 124 from the convex outer surface 158A oscillating or rotating on the concave inner surface 160A also allows or otherwise accounts for any movement due to the steering member 124, or the rack portion 126 specifically, being warped or otherwise having less than a design or ideal straightness.

Figure 11:
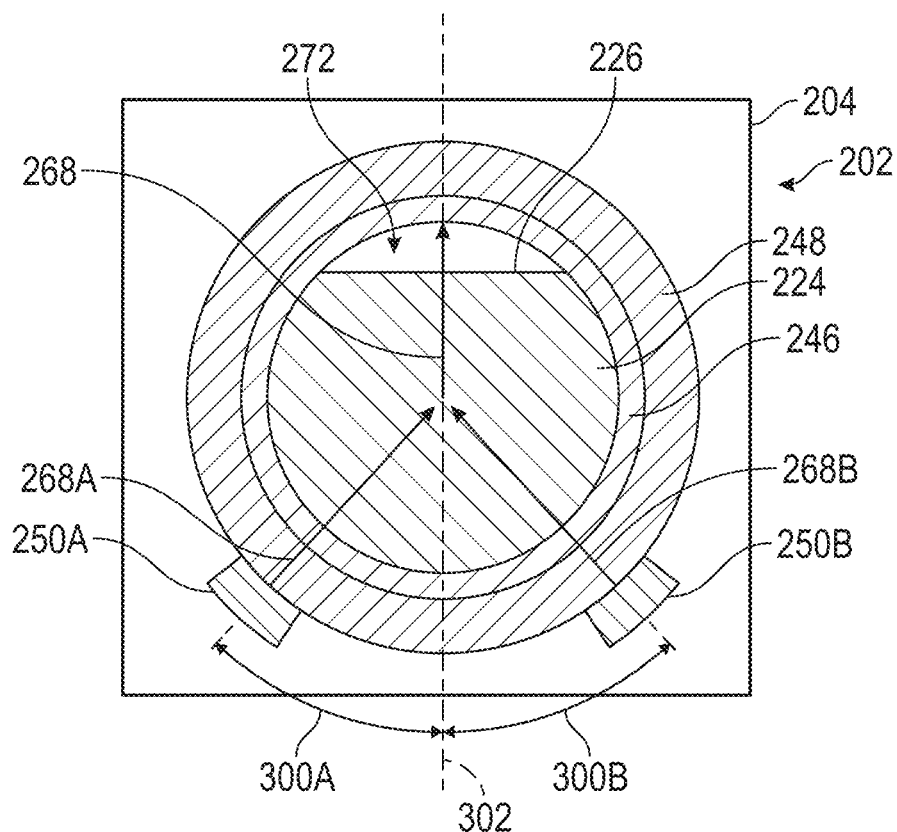
FIG. 11 is a schematic section view of a yoke support assembly in accordance with a second embodiment of the present invention.

Referring now to FIG. 11, there is illustrated a yoke support assembly, indicated generally at 202, in accordance with a second embodiment of the present invention. The yoke support assembly 202 is a variation of the yoke support assembly 102 of FIGS. 1-10C. As such, like reference numerals, increased by 100, designate corresponding parts in the drawings and detailed description thereof will be omitted.

The yoke support assembly 202 includes first and second spring members, indicated generally at 250A and 250B respectively. The first spring member 250A is positioned at a first offset angle 300A from a centerline 302 and the second spring member 250B is positioned at a second offset angle 300B from the centerline 302. The centerline 302 is preferably perpendicular to a rack portion 226. The first spring member 250A produces a first spring force 268A and the second spring member 250B produces a second spring force 268B. Preferably, the first and second spring forces 268A and 268B, respectively, act together as a combined spring force 268 that acts along the centerline 302 to maintain engagement between rack and pinion teeth (not shown).

As illustrated, both the first and the second spring forces 268A and 268B, respectively, act radially inward. Alternatively, the first and/or the second spring forces 268A and 268B, respectively, may act other than radially inward. Preferably, the first and second spring forces 268A and 268B, respectively, are of equal magnitude. Alternatively, the first and second spring forces 268A and 268B, respectively, may be of other than equal magnitude. As illustrated, the first and second offset angles 300A and 300B, respectively, are equal. Alternatively, the first and second offset angles 300A and 300B, respectively, may be other than equal. Thus, by varying the magnitude and/or direction of the first or second spring forces 268A and 268B, respectively, with or without also varying the first or second offset angles 300A and 300B, respectively, the combined spring force 268 may be varied, adjusted, or otherwise tuned so that the engagement between the rack and pinion teeth may also be varied, adjusted, or otherwise tuned.

Figure 12:
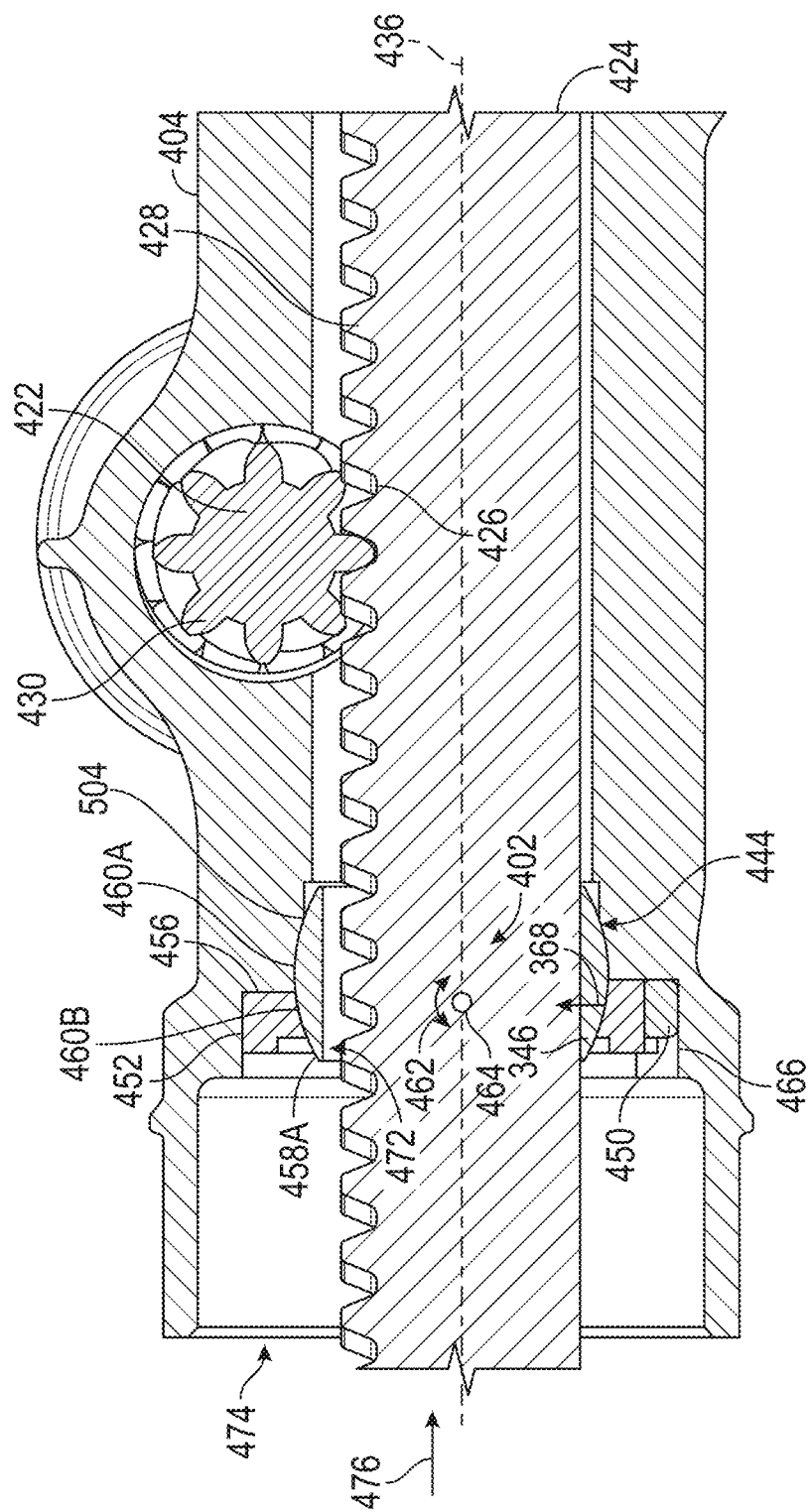
FIG. 12 is a section view of a yoke support assembly in accordance with a third embodiment of the present invention.

Referring now to FIG. 12, there is illustrated a yoke support assembly, indicated generally at 302, in accordance with a third embodiment of the present invention. The yoke support assembly 302 is a variation of the yoke support assembly 102 of FIGS. 1-10C. As such, like reference numerals, increased by 300, designate corresponding parts in the drawings and detailed description thereof will be omitted.

The yoke support assembly 302 includes a swivel yoke, indicated generally at 344, that includes an inner member 346. The inner member 346 has a convex surface 358. The yoke support assembly 302 further includes a first concave surface 360A provided on an inner surface 504 of a housing 304. The first concave surface 360A is complementary to the convex surface 358.

The inner member 346 is retained in the housing by a retention member 352. Preferably, the retention member 352 is provided with first threads. The first threads correspond with second threads provided on the housing 304 to retain the inner member 346. The inner member 346 is also provided with a second concave surface 360B. The second concave surface 360B is also complementary to the convex surface 358.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A vehicle steering assembly comprising:
   a housing;
   a steering member configured to be operatively disposed in the housing, the steering member including a rack portion having rack teeth;
   a pinion gear configured to divide the steering member into first and second sides and to be operatively rotated by a steering wheel, wherein the pinion gear has pinion teeth which are configured to be operatively engaged with the rack teeth;
   a yoke support assembly configured to be disposed on the first side of the steering member outboard an area of engagement of the rack teeth and the pinion teeth and configured to operatively maintain the engagement between the rack teeth and the pinion teeth;
   a ball nut operatively connected to the steering member on the second side of the steering member; and
   at least two members, a first one of the members having a convex bearing surface of the yoke support assembly, a second one of the members having a concave bearing surface of the yoke support assembly that is complementary to the convex bearing surface, the convex and concave bearing surfaces being configured to provide relative rotation between the convex and concave bearing surfaces and between the at least two members.

2. The vehicle steering assembly of claim 1 further comprising:
   a spring member of the yoke support assembly which is configured to operatively maintain the engagement between the rack teeth and the pinion teeth, wherein a first distance from the spring member to an end of the steering member is less than a second distance from the pinion gear to the end.

3. The vehicle steering assembly of claim 2 wherein the spring member is formed of a polymer or elastomer material.

4. The vehicle steering assembly of claim 2 wherein the spring member has a variable spring rate.

5. A vehicle steering assembly comprising:
   a housing;
   a steering member configured to be operatively disposed in the housing, the steering member includes a rack portion having rack teeth;
   a pinion gear configured to be operatively rotated by a steering wheel, wherein the pinion gear has pinion teeth which are configured to be operatively engaged with the rack teeth; and
   a yoke support assembly configured to support the steering member in the housing, wherein the yoke support assembly includes complementary convex and concave bearing surfaces and includes a spring member which is configured to produce a variable rate spring force, wherein the convex bearing surface and the concave bearing surface are configured to provide relative rotation between the convex and concave bearing surfaces, and wherein the variable rate spring force is configured to operatively maintain an engagement between the rack teeth and the pinion.

6. The vehicle steering assembly of claim 5 further comprising:
   at least two members, wherein one of the members has the convex bearing surface and the other of the members has the concave bearing surface and the convex and concave bearing surfaces are configured to provide relative rotation between the at least two members.

7. The vehicle steering assembly of claim 5 further comprising:
   an inner member of the yoke support assembly having the convex bearing surface; and
   an outer member of the yoke support assembly having the concave bearing surface.

8. The vehicle steering assembly of claim 5 further comprising:
   an inner member of the yoke support assembly having the convex bearing surface; and
   an inner surface of the housing having the concave bearing surface.

9. The vehicle steering assembly of claim 8 further comprising:
   a retention member configured to retain the yoke support assembly in the housing; and
   a second concave bearing surface on the retention member, wherein the second concave bearing surface is also complementary to the convex bearing surface and configured to provide relative rotation between the convex bearing surface and the second concave bearing surface.

10. The vehicle steering assembly of claim 5 further comprising:
    a second spring member which is configured to produce a second spring force, wherein the second spring force is configured to operatively maintain the engagement between the rack teeth and the pinion teeth.

11. The vehicle steering assembly of claim 5 wherein the spring member is formed of a polymer or elastomer material.

12. The vehicle steering assembly of claim 5 wherein the variable rate spring force has a logarithmic deflection curve.

13. The vehicle steering assembly of claim 5 further comprising:
    a retention member that is configured to retain the yoke support assembly in the housing.

14. The vehicle steering assembly of claim 5 further comprising:
    a ball nut operatively connected to the steering member, wherein the pinion gear is configured to divide the steering member into first and second sides, the yoke support assembly is disposed on the first side of the steering member outboard an area of the engagement between the rack teeth and the pinion teeth, and the ball nut is operatively connected to the steering member on the second side of the steering member.

15. A vehicle steering assembly comprising:
a housing;
a steering member configured to be operatively disposed in the housing, the steering member including a rack portion having rack teeth;
a pinion gear configured to divide the steering member into first and second sides and to be operatively rotated by a steering wheel, wherein the pinion gear has pinion teeth which are configured to be operatively engaged with the rack teeth;
a yoke support assembly configured to support the steering member in the housing, wherein the yoke support assembly is configured to be disposed on the first side of the steering member outboard an area of engagement of the rack teeth and the pinion teeth and includes complementary convex and concave bearing surfaces, wherein the convex bearing surface and the concave bearing surface are configured to provide relative rotation between the convex and concave bearing surfaces; and
a ball nut operatively connected to the steering member on the second side of the steering member.

16. The vehicle steering assembly of claim 15 further comprising:
an inner member of the yoke support assembly having the convex bearing surface; and
an outer member of the yoke support assembly having the concave bearing surface.

17. The vehicle steering assembly of claim 15 further comprising:
a spring member of the yoke support assembly which is configured to produce a variable rate spring force, wherein the variable rate spring force is configured to operatively maintain the engagement between the rack teeth and the pinion teeth.

* * * * *